US009046360B2

(12) United States Patent
Atwell et al.

(10) Patent No.: US 9,046,360 B2
(45) Date of Patent: *Jun. 2, 2015

(54) SYSTEM AND METHOD OF ACQUIRING THREE DIMENSIONAL COORDINATES USING MULTIPLE COORDINATE MEASUREMENT DEVICES

(71) Applicant: FARO Technologies, Inc., Lake Mary, FL (US)

(72) Inventors: Paul C. Atwell, Lake Mary, FL (US); Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/826,584

(22) Filed: Mar. 14, 2013

(65) Prior Publication Data

US 2014/0259714 A1 Sep. 18, 2014

(51) Int. Cl.
*G01B 11/14* (2006.01)
*G01C 15/00* (2006.01)

(52) U.S. Cl.
CPC ...................................... *G01C 15/00* (2013.01)

(58) Field of Classification Search
USPC ...................... 356/3–4.01, 601–603, 614–624
See application file for complete search history.

(56) References Cited

U.S. PATENT DOCUMENTS

| 6,166,809 | A | 12/2000 | Pettersen et al. |
| 7,312,862 | B2 | 12/2007 | Zumbrunn et al. |
| 8,659,749 | B2 | 2/2014 | Bridges |
| 2011/0301902 | A1 | 12/2011 | Panagas |
| 2012/0188559 | A1 | 7/2012 | Becker et al. |
| 2012/0206808 | A1 | 8/2012 | Brown et al. |
| 2012/0262550 | A1 | 10/2012 | Bridges |
| 2012/0262573 | A1 | 10/2012 | Bridges |
| 2012/0262728 | A1 | 10/2012 | Bridges et al. |
| 2012/0265479 | A1 | 10/2012 | Bridges |
| 2013/0155386 | A1 | 6/2013 | Bridges |

FOREIGN PATENT DOCUMENTS

| JP | H11513495 A | 11/1999 |
| JP | 2006276012 A | 10/2006 |
| WO | 2007124010 A2 | 11/2007 |

OTHER PUBLICATIONS

"DLP-Based Structured Light 3D Imaging Technologies and Applications" by J. Geng; Proceedings of SPIE, vol. 7932. Published Feb. 11, 2011, 15 pages.
International Search report of the International Application No. PCT/US2014/027040 mailed Jul. 16, 2014.

(Continued)

*Primary Examiner* — Tri T Ton
(74) *Attorney, Agent, or Firm* — Cantor Colburn LLP

(57) ABSTRACT

A method is provided for determining the three dimensional coordinates of points on the surface of an object. The method includes providing a structured light scanner and a coordinate measurement device. The coordinate measurement device tracks the location and orientation of the structured light scanner during operation. The location and orientation data is combined with image frames captured by the scanner to allow registration of the image frames relative to each other. The three-dimensional coordinates of points on the surface of the object may then be determined in the frame of reference of the coordinate measurement device.

16 Claims, 4 Drawing Sheets

(56) References Cited

OTHER PUBLICATIONS

Written Opinion of the International Searching Authority for International Application No. PCT/US2014/027040 mailed Jul. 16, 2014.
English Abstract of CN1290850; Applicant: Univ Shanghai Communication; Published Date: Apr. 11, 2001; 1 pg.
English Abstract of CN1362692; Applicant: Univ Tianjin; Published Date: Aug. 7, 2002; 1 pg.
English Abstract of JP2005010585; Applicant: TDK Corp; Published Date: Jan. 13, 2005; 1 pg.
English Abstract of JPH06214186; Applicant: Eastman Kodak CO LTD; Published Date: Aug. 5, 1994; 1 pg.
English Abstract of JPH09113223; Applicant: Fuji Xerox CO LTD; Published Date: May 2, 1997; 1 pg.

SYSTEM AND METHOD OF ACQUIRING THREE DIMENSIONAL COORDINATES USING MULTIPLE COORDINATE MEASUREMENT DEVICES

BACKGROUND OF THE INVENTION

The subject matter disclosed herein relates to a system method of acquiring three-dimensional coordinates of points on a surface of an object and in particular to a system of method of operating a laser tracker in conjunction with a scanner device to track the position and orientation of the scanner device during operation.

The acquisition of three-dimensional coordinates of an object or an environment is known. Various techniques may be used, such as time-of-flight or triangulation methods for example. A time-of-flight system such as a laser tracker, for example, directs a beam of light such as a laser beam toward the spot to be measured. An absolute distance meter is used to determine the distance from the distance meter to the spot based on length of time it takes the light to travel to the spot and return. By moving the laser beam over the surface of the object, the coordinates of the object surface may be ascertained. Time-of-flight systems have advantages in being accurate, but in some cases may be slower than systems that project a plurality of light spots onto the surface at each instant in time.

A triangulation system such as a scanner in contrast projects either a line of light (e.g. laser line probe) or a pattern of light (e.g. structured light) onto the surface. In the system, a camera is coupled to the projector in a fixed mechanical relationship. The light/pattern emitted from the projector is reflected off of the surface and detected by the camera. Since the camera and projector are arranged in a fixed relationship, the distance to the object may be determined from captured images using trigonometric principles. Triangulation systems provide advantages in quickly acquiring coordinate data over large areas.

In some systems, during the scanning process, the scanner acquires a series of sequential images of the light/pattern reflected off of the object. These images are then registered relative to each other so that the position and orientation of each image relative to the other images is known. Where the scanner is handheld, various techniques have been used to register the images. One common technique uses features in the images to match overlapping areas of adjacent image frames. This technique works well when the object being measured has many features relative to the field of view of the scanner. However, if the object contains a relatively large flat or curved surface, the images may not properly register relative to each other.

Accordingly, while existing coordinate measurement devices are suitable for their intended purposes, the need for improvement remains, particularly in improving the registration of images acquired by a scanner device.

BRIEF DESCRIPTION OF THE INVENTION

According to one aspect of the invention, a method of determining coordinates of points on the surface of an object with a coordinate measurement device and a portable structured light scanner device is provided. The method includes providing a structured light scanner having a body, a first camera and a first projector coupled to the body wherein the first camera is configured to receive light reflected from the object surface. The structured light scanner includes a probe extending from a first side of the body and a six degree of freedom retroreflector coupled to a second side of the body. The structured light scanner further having a first processor configured to determine the coordinates of points on an object surface in a scanner frame of reference. A coordinate measurement device is provided. The coordinate measurement device is configured to measure a translational set of coordinates and an orientational set of coordinates, the translational set being values of three translational degrees of freedom of the structured light scanner in the device frame of reference and the orientational set being values of three orientational degrees of freedom of the structured light scanner in the device frame of reference. The translational set and the orientational set defining a position and orientation of the structured light scanner in space, the coordinate measurement device configured to send a first beam of light to the retroreflector and to receive a second beam of light from the retroreflector, the second beam of light being a portion of the first beam of light, the coordinate measurement device including a device processor. The device processor configured to determine the orientational set and the translational set, the translational set based at least in part on the second beam of light. A fixture is provided having a portion configured to receive the probe. The probe is placed on the portion. The structured light scanner is moved in a predetermined pattern while maintaining the probe in contact with the portion and tracking the coordinates and orientation of the six degree of freedom retroreflector. The translational set of coordinates and orientational set of coordinates are determined for the structured light scanner in response to the movement of the structured light scanner.

According to another aspect of the invention, a method is provided. The method includes providing a structured light scanner having a first camera and a first projector arranged in a fixed relationship to each other, the structured light scanner configured to acquire a plurality of images of an object, the structured light scanner having a six degree of freedom retroreflector arranged in a fixed relationship to the first camera and first projector. A coordinate measurement device is provided having a light source and a second camera arranged in a fixed relationship to each other, the coordinate measurement device configured to determine the location and orientation of the structured light scanner based at least in part on a translational set of coordinates and an orientational set of coordinates. The translational set being values of three translational degrees of freedom of the structured light scanner in a device frame of reference and the orientational set being values of three orientational degrees of freedom of the structured light scanner in the device frame of reference. The object is scanned with the structured light scanner and obtaining at least a first image frame and a second image frame. The six degree of freedom retroreflector is tracked with the coordinate measurement device to determine the orientational set of coordinates and the translational set of coordinates. Coordinates of a plurality of points on a surface of the object are determined in the device frame of reference based at least in part on the first image frame, the second image frame, the orientational set of coordinates and the translational set of coordinates.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention provide advantages in registration of images acquired by a scanner device. Embodiments of the invention provide further advantages in the tracking of a handheld scanner device with a coordinate measurement device such as a laser tracker device. Still further embodiments of the invention provide advantages in calibrating/compensating the scanner device for being tracked by the laser tracking device.

Figure 1:
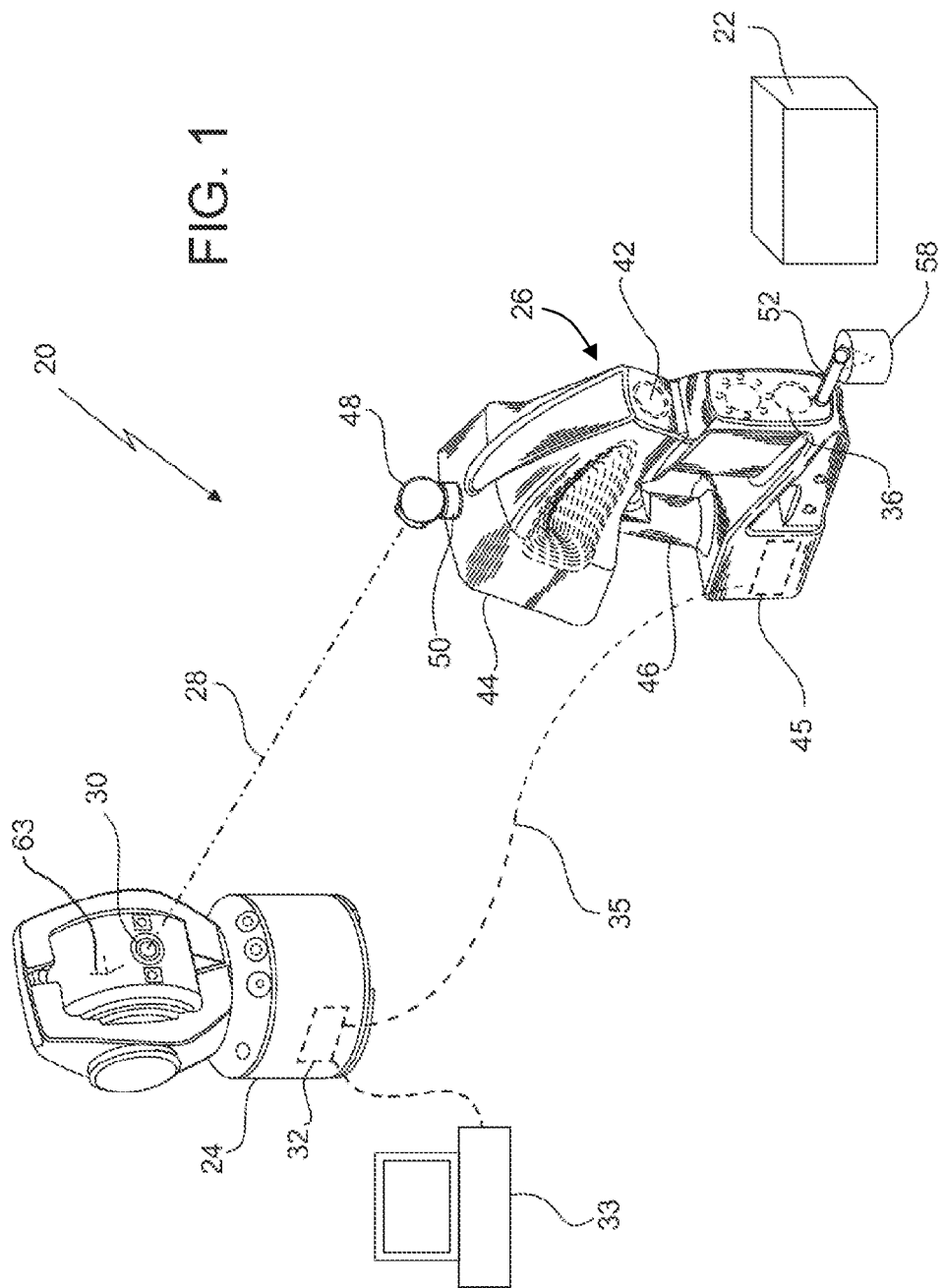
FIG. 1 is a perspective view of a system for measuring an object in accordance with an embodiment of the invention.
Figure 2:
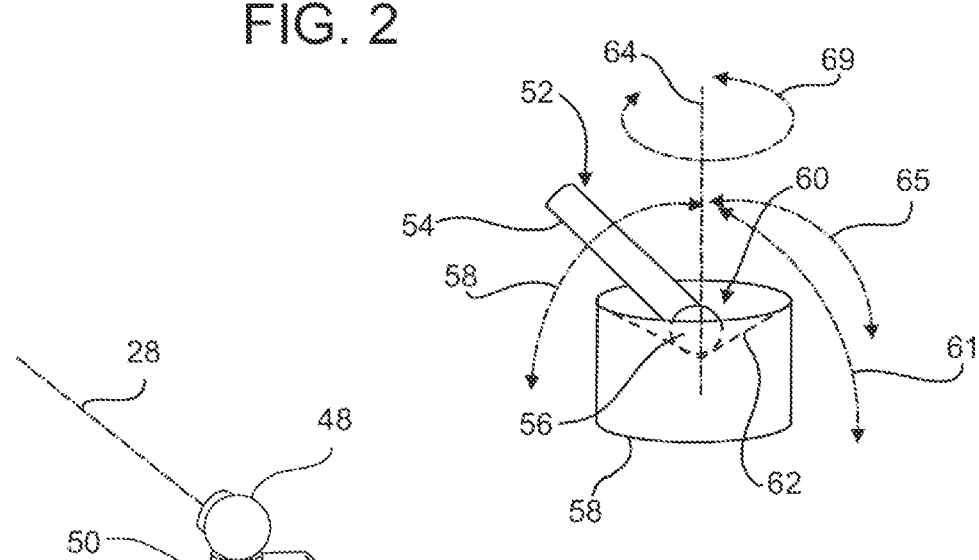
FIG. 2 is a partial perspective view of a scanner probe member in a fixture.
Figure 3:
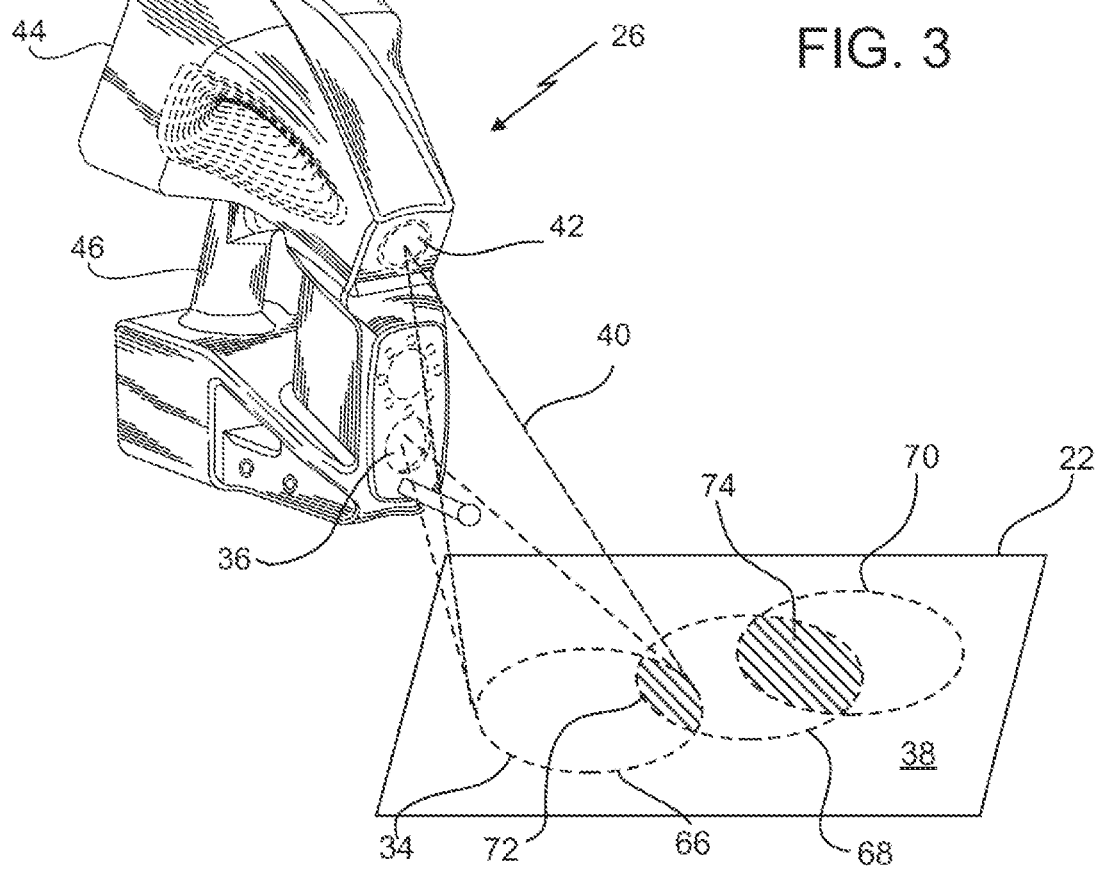
FIG. 3 is a partial perspective view of the system of FIG. 1 with the scanner device scanning an object.

Referring to the FIGS. 1-3, a system 20 is shown for measuring the three-dimensional coordinates of an object 22. The system includes a first coordinate measurement device, such as laser tracker 24 that cooperates with a second coordinate measurement device, such as scanner 26. The laser tracker 24 may be a device such as that described in commonly owned U.S. patent application Ser. No. 12/849,065 filed on Aug. 3, 2010 or U.S. patent application Ser. No. 13/453,002 filed Apr. 23, 2012, both of which are incorporated by reference herein in their entirety.

The laser tracker 24 includes a projector that emits light, such as a laser for example, and a distance meter. The projector and distance meter are configured to emit and receive light 28 via an aperture 30. The distance meter may be an absolute distance meter assembly which allows the laser tracker 24 to optically measure the distance between the laser tracker 24 and a cooperative target, such as a retroreflector for example.

The laser tracker 24 may include motors, angular encoders and a position detector that allows the laser tracker 24 to track the position of a retroreflector as it is moved through space. Provided within the tracker is a controller 32 having a processor configured to determine the three dimensional coordinates of the retroreflector based at least in part on the distance to the retroreflector and on signals from the angular encoders. The controller 32 may further have additional circuitry, including but not limited to communications circuits which allow the laser tracker 23 to communicate with the scanner 26 or a computer 33 via a wired or wireless communications medium 35.

In the exemplary embodiment, the scanner 26 is a structured light type of coordinate measurement device. The scanner 26 first emits a structured light pattern 34 with projector 36 onto surface 38 of an object 22. The structured light pattern 34 may include the patterns disclosed in the journal article "DLP-Based Structured Light 3D Imaging Technologies and Applications" by Jason Geng published in the Proceedings of SPIE, Vol. 7932, which is incorporated herein by reference. The light 34 from projector 36 is reflected from the surface 38 and the reflected light 40 is received by the camera 42. It should be appreciated that variations in the surface 38 create distortions in the structured pattern when the image of the pattern is captured by the camera 42. Since the pattern is formed by structured light, it is possible in some instances for a controller 45 to determine a one to one correspondence between the pixels in the emitted pattern and the pixels in the imaged pattern.

Determining the correspondence between pixels enables triangulation principals to be used to determine the coordinates of each pixel in the imaged pattern. The collection of three-dimensional coordinates of the surface 38 is sometimes referred to as a point cloud. By moving the scanner 26 over the surface 38, a point cloud of the entire object 22 may be created. The coordinates of the measured points are typically determined in a local frame of reference of the scanner 26.

The scanner 26 further includes a body 44 having a handle 46 that allows an operator to carry and operate the scanner 26. In the exemplary embodiment, a six degree of freedom retroreflector 48 is coupled to the body 44 along a top surface. The retroreflector 48 may be similar to the one described in commonly owned U.S. patent application Ser. No. 13/370,339 filed on Feb. 10, 2012 or U.S. patent application Ser. No. 13/443,946 filed on Apr. 11, 2012, both of which are incorporated by reference herein in their entirety. In one embodiment, the retroreflector 48 is coupled to a nest 50. The nest 50 may be a magnetic nest, or may include a clamping arrangement that holds the retroreflector 48 in place during operation. In still other embodiments, one or more the retroreflectors 48 are integrated into the body 44.

The scanner 26 further includes a probe member 52. In the exemplary embodiment, the probe member 52 includes a shaft portion 54 and a spherical end member 56 having a predetermined diameter. The probe member 52 is coupled to the body 44 and is in a predetermined fixed geometrical relationship with the retroreflector 48. It should be appreciated that while embodiments herein illustrate the probe member 52 as being located in the lower front portion of the scanner 26, this is for exemplary purposes and the claimed invention should not be so limited. In other embodiments, the probe member 52 may be positioned on other portions of the scanner 26, such as on a lower surface for example.

Since the scanner 26 includes the retroreflector 48, it is possible for the laser tracker 24 to track and record the position of the scanner 26 during the scanning process. As will be discussed in more detail below, the tracking of the scanner 26 facilitates the registration of images acquired by the scanner 26 and provides advantages in allowing registration in featureless regions of the object 22.

Before the scanner 26 is tracked by the laser tracker 24, the scanner 26 needs to be calibrated or compensated such that the orientation of the retroreflector 48 and the orientation of the scanner 26 are known to the laser tracker 22. In the exemplary embodiment, the calibration of the scanner 26 to the laser tracker 24 is performed using a fixture 58. The fixture 58 is a device having a predetermined geometric configuration that is known to the laser tracker 24. In one embodiment, the fixture 58 includes a recess 60 having a conical or frustoconical surface 62 having a predetermined internal angle such as 60 to 120 degrees for example. The surface 62 is configured such that when the spherical end member 56 is inserted into the recess 60, the spherical end member 56 only touches the surface 62 in three places. In another embodiment, the fixture 58 includes three spheres placed on a circle and separated from one another by 60 degrees. It should be appreciated that the operator may position the fixture 58 in one location for purposes of calibration and then move the scanner 26 to a second location where the object 22 is measured.

To calibrate or compensate the scanner 26 to the laser tracker 24, a calibration routine is initiated that guides the operator through the calibration process. The user interface for the operator may be located on the scanner 26, the laser tracker 24 or on remote computer 33 for example. In one embodiment, the calibration process shows the operator a graphical representation of the probe member 52 in the fixture 58, similar to that shown in FIG. 2 for example. The operator is then instructed to move the scanner 26 in a predetermined pattern while maintaining the spherical end member 56 in contact with the surface 62. In the exemplary embodiment, the predetermined pattern includes first pivoting the scanner 26 about the spherical end member 56 in three directions as indicated by arrows 58, 61, 65. In one embodiment, the directions 58, 60 are 90 degrees apart and the directions 61, 65 are 90 degrees apart. Second, the scanner 26 is rotated or swiveled about the axis 64 as indicated by arrow 69.

As the scanner 26 is pivoted and rotated, the laser tracker 24 collects information on the position and orientation of the retroreflector 48 at each of movements in the predetermined pattern. For each movement, it is known that the spherical end member 56 is in a fixed position in contact with the surface 62. By analyzing the multiple measurements mathematically, the orientation and position of the six degree of freedom retroreflector 48 may be determined in relation to the scanner 46. The general method for solving such problems is referred to as a best-fit solution, usually by methods of least-squares minimization. Once the calibration process is complete, the laser tracker 24 is able to measure location and orientation information on the scanner 26 relative to the laser tracker local frame of reference 63.

Figure 4:
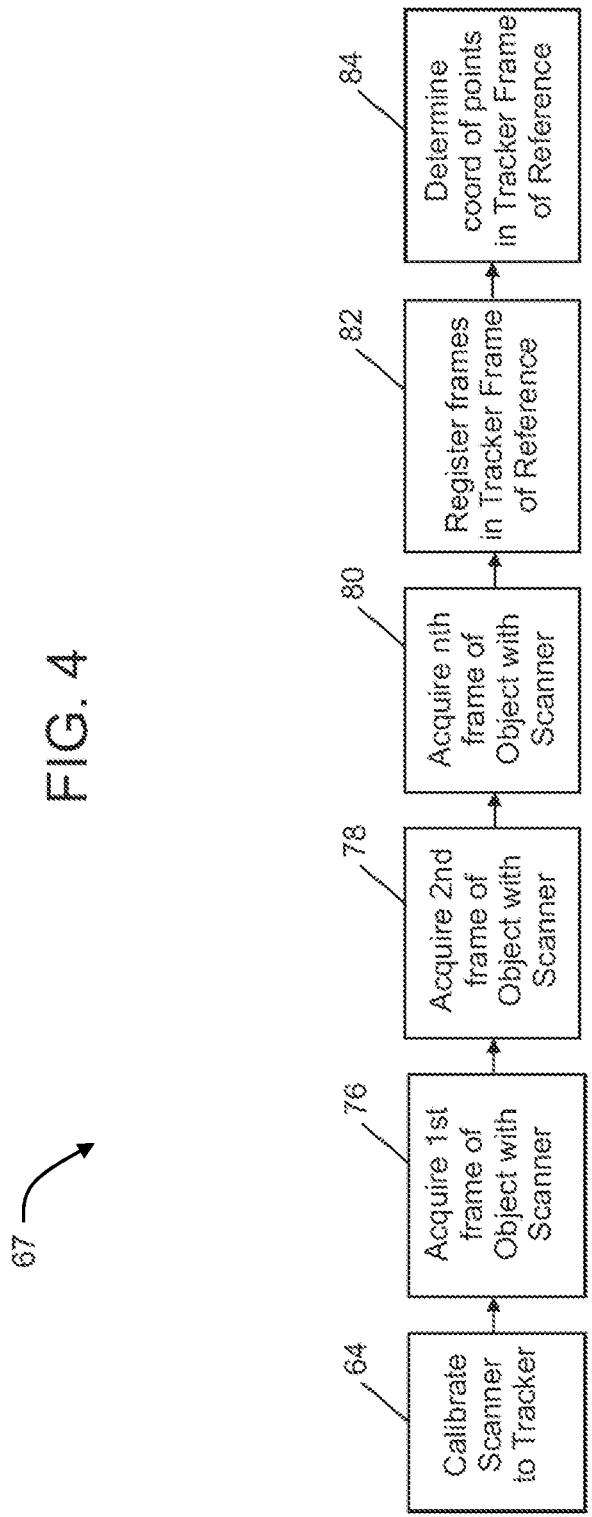
FIG. 4 is a flow diagram of a method of determining the three dimensional coordinates of points on the surface of an object in accordance with an embodiment of the invention.

Referring now to FIGS. 3-4 a method 67 of operating the laser tracker 24 and scanner 26 is shown for obtaining three dimensional coordinates of points on the surface 38 of object 22. Prior to operating the scanner 26, the calibration of the scanner 26 to the laser tracker 24 as described herein above is performed in block 64. As the scanner 26 is operated, light 28 from the laser tracker 24 is reflected off the retroreflector 48 so that the location and orientation of the scanner 26 is known to the laser tracker 24. As the scanner 26 is operated, the structured light pattern is emitted from the projector 36 reflected off of the surface 38 and captured by the camera 42. In the exemplary embodiment, the camera 42 captures image frames at a rate of 15-30 frames per second. Each of the sequential image frames 66, 68, 70 are illustrated as circles in FIG. 3, however the frames 66, 68, 70 may also be other shapes, such as a square or rectangle for example.

Due to the relatively high frame rate of the camera 42, there is likely to be areas of overlap between the image frames, represented by cross-hatched areas 72, 74. The amount of overlap will depend on the speed at which the operator moves the scanner 26. In prior art systems, features of object 22 that are located in the areas of overlap allowed for registration of the image frames relative to each other. However, when a flat or otherwise featureless surface is measured, the registration becomes more difficult and there is a tendency in prior art systems to drift or become "potato chip" shaped. Embodiments of the present invention provide advantages since the laser tracker 24 records the location and orientation of the scanner 26 as each image frame 66, 68, 70 is captured. Thus, the registration of the frames 66, 68, 70 allows for accurate location of the frames relative to each other without relying on the features of object 22. It should be further appreciated that this also provides advantages in allowing registration of image frames where there is no overlap between adjacent image frames.

After calibrating the scanner 26 in block 64, the scanner 26 scans the surface 38 in block 76 to acquire image frame 66, while the laser tracker 24 records the location and orientation of the scanner 26. The process 67 proceeds to block 78 where the second frame 68 is captured along with the position and orientation of the scanner 26. This process continues until the $N^{th}$ frame is captured by the camera 42 in block 80. The process 67 then proceeds to register the image frames by matching adjacent frames relative to each other in block 82 using the location and position information measured and recorded by the laser tracker 24. The coordinates of the points on the surface of object 22 may then be determined in block 84. In the exemplary embodiment, the coordinates of the points are determined relative to the tracker frame of reference 63.

Figure 5:
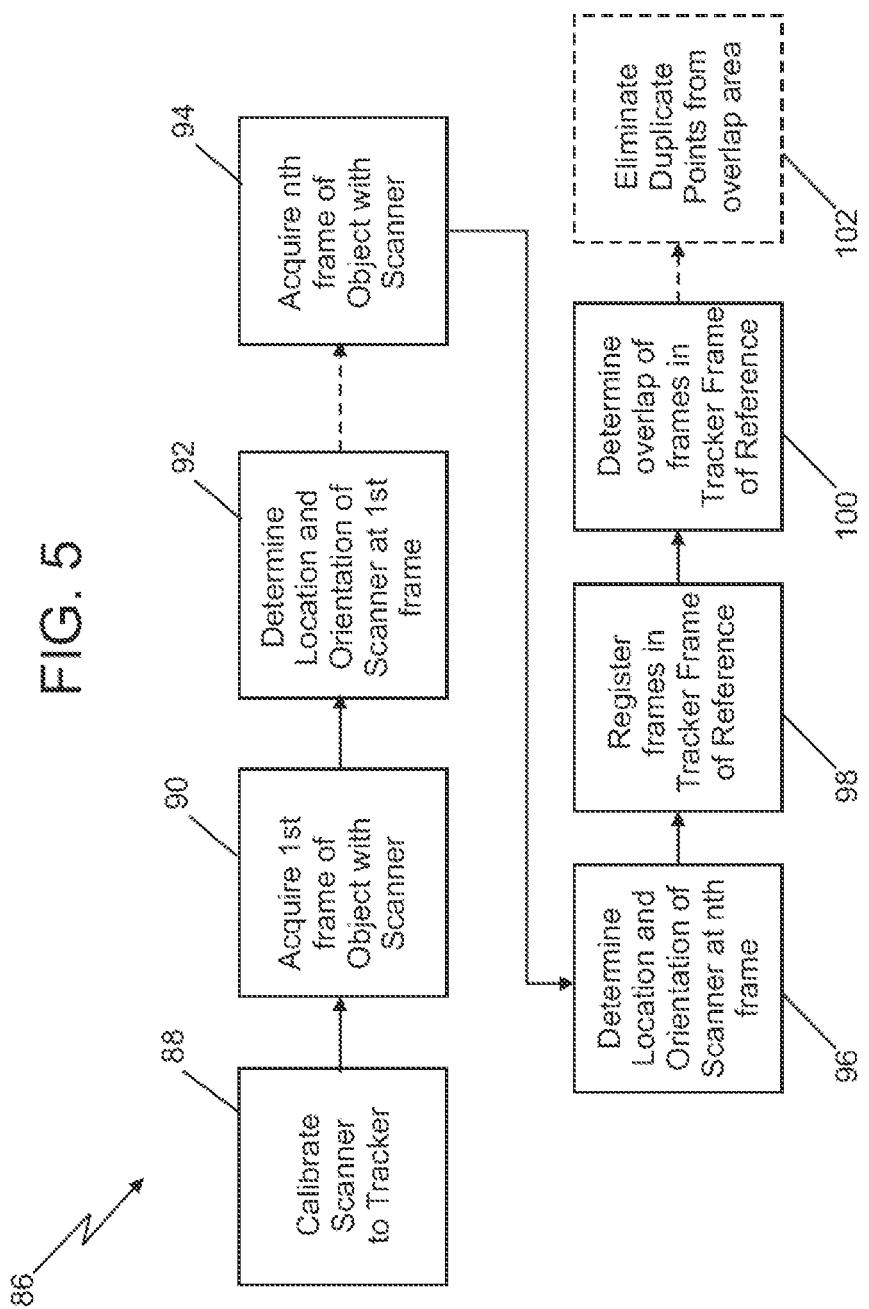
FIG. 5 is a flow diagram of a method of determining the three-dimensional coordinates of points on the surface of an object in accordance with another embodiment of the invention.

Referring now to FIGS. 3 and 5, another embodiment of a method 86 of operating the laser tracker 24 and scanner 26 is shown for obtaining three dimensional coordinates of points on the surface 38 of object 22. In this embodiment, the scanner 26 is calibrated to the laser tracker 24 in block 88 as described herein above. With the laser tracker 24 tracking the position and orientation of the scanner 26, the scanner 26 is operated to scan the surface 38 of object 22. The scanner 26 acquires the first frame 66 in block 90. The method 86 then determines the location and orientation of the scanner 26 at the time of the capture of the first frame 66 is determined in block 92. The process 86 continues capturing image frames and recording the location and orientation of the scanner 26 until the $N^{th}$ image frame is captured and the final location and orientation of the scanner 26 recorded in block 94 and block 96 respectively. The image frames are registered to each other in the tracker frame of reference 63 in block 98. The process 86 then proceeds to determine the areas of overlap 72, 74 in block 100. In one embodiment, the process 86 then proceeds to block 102 where duplicate or substantially duplicate data of points in the areas of overlap 72, 74 are eliminated to reduce the size of the coordinate data.

It should be appreciated that the process of registering the frames and determining the coordinates of points on the surfaces of the object may be performed by the laser tracker 24, the scanner 26, the computer 33 or a combination of the foregoing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of determining coordinates of points on the surface of an object with a coordinate measurement device and a portable structured light scanner device, the method comprising:

providing a structured light scanner having a body, a first camera and a first projector coupled to the body wherein the first camera is configured to receive light reflected from the object surface, the structured light scanner having a probe extending from a first side of the body, the structured light scanner further having a six degree of freedom retroreflector coupled to a second side of the body, the structured light scanner further having a first processor configured to determine the coordinates of points on an object surface in a scanner frame of reference;

providing a coordinate measurement device, the coordinate measurement device configured to measure a translational set of coordinates and an orientational set of coordinates, the translational set being values of three translational degrees of freedom of the structured light scanner in the device frame of reference and the orientational set being values of three orientational degrees of freedom of the structured light scanner in the device frame of reference, the translational set and the orientational set defining a position and orientation of the structured light scanner in space, the coordinate measurement device configured to send a first beam of light to the retroreflector and to receive a second beam of light from the retroreflector, the second beam of light being a portion of the first beam of light, the coordinate measurement device including a device processor, the device processor configured to determine the orientational set and the translational set, the translational set based at least in part on the second beam of light;

providing a fixture having a portion configured to receive the probe;

placing the probe on the portion;

moving the structured light scanner in a predetermined pattern while maintaining the probe in contact with the portion and tracking the coordinates and orientation of the six degree of freedom retroreflector; and determining the translational set of coordinates and orientational set of coordinates for the structured light scanner in response to the movement of the structured light scanner.

2. The method of claim 1 wherein the predetermined pattern includes pivoting the structured light scanner about a tip of the probe while the probe is in contact with the portion.

3. The method of claim 2 wherein the predetermined pattern includes pivoting the structured light scanner in three directions and rotating the light scanner about an axis substantially perpendicular to the portion.

4. The method of claim 3 wherein the portion includes a conical surface.

5. The method of claim 1 further comprising:
scanning the object with the structured light scanner; and
tracking the location and orientation of the six degree of freedom retroreflector with the coordinate measurement device while the object is being scanned.

6. The method of claim 5 further comprising:
determining a first coordinates of a first plurality of points on the object from a first image with the first processor, the first coordinates being relative to a scanner coordinate frame; and
determining a second coordinates of the first plurality of points relative to a device coordinate frame with the device processor.

7. The method of claim 6 wherein the step of determining the second coordinates is based at least in part on the first coordinates and the translational set and orientational set of the structured light scanner.

8. The method of claim 7 further comprising:
determining a third coordinates of a second plurality of points on the object from a second image with the first processor, the first coordinates being relative to a scanner coordinate frame; and
determining a fourth coordinates of the second plurality of points relative to a device coordinate frame with the device processor.

9. The method of claim 8 further comprising registering the first frame to the second frame in the device coordinate frame.

10. The method of claim 9 further comprising:
determining an area of overlap between the first image and the second image; and
determining duplicate points in the area of overlap.

11. A method comprising:
providing a structured light scanner having a first camera and a first projector arranged in a fixed relationship to each other, the structured light scanner configured to acquire a plurality of images of an object, the structured light scanner having a six degree of freedom retroreflector arranged in a fixed relationship to the first camera and first projector;

providing a coordinate measurement device having a light source and a second camera arranged in a fixed relationship to each other, the coordinate measurement device configured to determine the location and orientation of the structured light scanner based at least in part on a translational set of coordinates and an orientational set of coordinates, the translational set being values of three translational degrees of freedom of the structured light scanner in a device frame of reference and the orientational set being values of three orientational degrees of freedom of the structured light scanner in the device frame of reference;

scanning the object with the structured light scanner and obtaining at least a first image frame and a second image frame;

tracking the six degree of freedom retroreflector with the coordinate measurement device to determine the orientational set of coordinates and the translational set of coordinates; and determining coordinates of a plurality of points on a surface of the object in the device frame of reference based at least in part on the first image frame, the second image frame, the orientational set of coordinates and the translational set of coordinates.

12. The method of claim 11 further comprising the step of calibrating the structured light scanner to the coordinate measurement device, the step of calibrating comprising:
providing a probe on the structured light scanner;
providing a fixture having a portion configured to receive the probe;
placing the probe on the portion;
moving the structured light scanner in a predetermined pattern while maintaining the probe in contact with the portion and tracking the coordinates and orientation set of the six degree of freedom retroreflector; and
determining the translational set of coordinates and orientational set of coordinates for the structured light scanner in response to the movement of the structured light scanner.

13. The method of claim 11 further comprising registering the first image frame to the second image frame in the device frame of reference.

14. The method of claim 13 further comprising determining an area of overlap between the first image frame and the second image frame.

15. The method of claim 14 further comprising deleting duplicate points within the area of overlap.

16. The method of claim 13 further comprising determining the coordinates of the plurality of points on the surface of the object in a scanner frame of reference.

* * * * *